US012607569B2

(12) United States Patent
Matsui

(10) Patent No.: US 12,607,569 B2
(45) Date of Patent: Apr. 21, 2026

(54) VISUAL INSPECTION SYSTEM FOR ANNULAR PRODUCT

(71) Applicant: DAIICHI JITSUGYO VISWILL CO., LTD., Osaka (JP)

(72) Inventor: Koji Matsui, Osaka (JP)

(73) Assignee: DAIICHI JITSUGYO VISWILL CO., LTD., Osaka (JP)

( * ) Notice: Subject to any disclaimer, the term of this patent is extended or adjusted under 35 U.S.C. 154(b) by 162 days.

(21) Appl. No.: 18/465,612

(22) Filed: Sep. 12, 2023

(65) Prior Publication Data

US 2024/0085344 A1 Mar. 14, 2024

(30) Foreign Application Priority Data

Sep. 13, 2022 (JP) ................................. 2022-145418

(51) Int. Cl.
*G01N 21/95* (2006.01)
*G06T 7/00* (2017.01)
*H04N 23/56* (2023.01)

(52) U.S. Cl.
CPC ........... *G01N 21/95* (2013.01); *G06T 7/0004* (2013.01); *H04N 23/56* (2023.01); *G06T 2207/30108* (2013.01)

(58) Field of Classification Search
CPC .. G01N 21/95; G01N 21/8806; G01N 21/952; G01N 21/892; G01N 21/01; G01N 2021/0112; G01N 2021/8845; G06T 7/0004; G06T 2207/30108; H04N 23/56
See application file for complete search history.

(56) References Cited

U.S. PATENT DOCUMENTS

| | | | |
|---|---|---|---|
| 7,372,062 B2 * | 5/2008 | Tanaka ............... | G01N 21/4788 |
| | | | 250/559.44 |
| 9,948,841 B2 * | 4/2018 | Takahashi ........... | G01M 17/027 |
| 10,222,342 B2 * | 3/2019 | Ortner .................. | G01N 21/892 |
| 2004/0174518 A1 * | 9/2004 | Naiki .................. | G01N 21/8806 |
| | | | 356/237.2 |
| 2014/0043472 A1 * | 2/2014 | Takahashi ........... | G01M 17/027 |
| | | | 348/135 |

(Continued)

FOREIGN PATENT DOCUMENTS

| | | | | | |
|---|---|---|---|---|---|
| JP | H09281054 A | * | 10/1997 | | |
| JP | 2021051032 A | * | 4/2021 | .......... | G01N 21/892 |
| KR | 20160047360 A | * | 5/2016 | | |

*Primary Examiner* — Richard A Hansell, Jr.
(74) *Attorney, Agent, or Firm* — von Briesen & Roper, s.c.

(57) ABSTRACT

The present invention includes a holding unit holding an annular product, a rotation drive unit causing the holding unit holding the annular product to rotate about a center axis of the annular product, a first illumination unit having a line-shaped light projector along a radial direction of the annular product and radiating a filmy illumination light from the light projector to an outside surface of the annular product, a line sensor camera having a line-shaped light receiving unit and arranged such that the light receiving unit is parallel to the light projector and imaging, from a direction identical to the radiating direction of the first illumination unit, the outside surface of the annular product illuminated by the first illumination unit as a region to be imaged, and a judgment device processing an image captured by the line sensor camera to judge whether the annular product is defective in appearance.

4 Claims, 13 Drawing Sheets

(56)     References Cited

U.S. PATENT DOCUMENTS

| | | | |
|---|---|---|---|
| 2014/0373614 A1* | 12/2014 | Steinbichler ........ | G01M 17/027 |
| | | | 73/146 |
| 2017/0160079 A1* | 6/2017 | Takebuchi .......... | G01M 17/021 |
| 2017/0350793 A1* | 12/2017 | Boffa .................. | G01M 17/027 |
| 2018/0266810 A1* | 9/2018 | Boffa ................. | G01N 21/8851 |
| 2018/0299353 A1* | 10/2018 | Held ................... | G01M 17/027 |
| 2018/0372592 A1* | 12/2018 | Held .................... | G01M 17/02 |
| 2019/0145862 A1* | 5/2019 | Boffa .................. | G01B 11/245 |
| | | | 348/92 |
| 2021/0208085 A1* | 7/2021 | Akagi ............... | G01N 21/8851 |

* cited by examiner

VISUAL INSPECTION SYSTEM FOR ANNULAR PRODUCT

TECHNICAL FIELD

The present invention relates to a visual inspection system that captures an image of the appearance of an object using a camera and processes the captured image to judge whether the object is defective in appearance or not, and more particularly to a visual inspection system that is suitable for inspection of the appearance of an annular product having a mirror-like surface.

BACKGROUND ART

A known example of the visual inspection system inspecting the appearance of an annular product is disclosed in Japanese Unexamined Patent Application Publication No. 2021-51032 (Patent Literature 1).

This disclosed visual inspection system includes a conveyance device, a front-surface image capturing device, a rear-surface image capturing device, an outer-side-surface image capturing device, an inner-side-surface image capturing device, and a judgment device. The conveyance device has a transparent circular glass plate arranged horizontally and rotates the glass plate horizontally to convey an annular resin product as an inspection target fed on the glass plate in the rotating direction of the glass plate. The front-surface image capturing device captures an image of the front surface of the inspection target being conveyed by the conveyance device. The rear-surface image capturing device captures an image of the rear surface of the inspection target. The outer-side-surface image capturing device captures an image of the outer side surface of the inspection target. The inner-side-surface image capturing device captures an image of the inner side surface of the inspection target. The judgement device processes the images captured by the image capturing devices to judge whether the inspection target is defective in appearance or not.

In this visual inspection system, the front-surface image capturing device, the rear-surface image capturing device, the outer-side-surface image capturing device, and the inner-side-surface image capturing device capture images of the front surface, rear surface, outer side surface, and inner side surface of the inspection target while the inspection target fed on the glass plate of the conveyance device is being conveyed in the rotating direction of the glass plate, and the judgement device processes the captured images to judge whether the inspection target is defective in appearance or not.

In this visual inspection system, for example, the front-surface image capturing device for inspection of the front surface of the annular product has a front-side blue illumination unit, a front-side red illumination unit, and a green illumination unit for front surface inspection. The front-side blue illumination unit is arranged between a front-surface imaging camera and the glass plate and radiates blue light toward the front surface of the inspection target present at a front-surface image capturing position. The front-side red illumination unit has an annular light projector arranged coaxially with the imaging optical axis of the front-surface imaging camera between the front-side blue illumination unit and the glass plate and radiates red light toward the center thereof from the light projector to illuminate the front-side outer and inner peripheral surfaces of the inspection target present at the front-surface image capturing position. The green illumination unit for front surface inspection is arranged below the glass plate at the front-surface image capturing position and radiates green light upward.

The front-side blue illumination unit consists of a first front-side blue illumination unit disposed on the upper side and a second front-side blue illumination unit disposed on the lower side. The first front-side blue illumination unit has an annular light projector disposed coaxially with the imaging optical axis of the front-surface imaging camera and is configured to radiate blue light toward the front-surface image capturing position located below from the light projector. The second front-side blue illumination unit has a dome-shaped reflective member and an annular light projector. The reflective member has an opening at the lower end thereof and has an opening at the upper end thereof for allowing the light radiated from the light projector of the first front-side blue illumination unit to pass therethrough. The reflective member has a diffuse-reflective surface on an inner surface thereof. The light projector is disposed at the lower edge of the reflective member and radiates blue light toward the inner surface of the reflective member. Thus, the second front-side blue illumination unit is configured to radiate the light radiated from the light projector and reflected by the diffuse-reflective surface toward the front-surface image capturing position.

In this conventional visual inspection system having the above-described configuration, the entire front surface side of the annular product is illuminated mainly with a non-directional uniform diffused illumination light that is radiated by the front-side blue illumination unit.

CITATION LIST

Patent Literature

[Patent Literature 1] Japanese Unexamined Patent Application Publication No. 2021-51032

SUMMARY OF INVENTION

Technical Problem

In recent years, the annular resin product as mentioned above, which is represented by an O-ring and is used as a seal in various devices, has been required to have higher airtightness. For this reason, such an O-ring is finished to have a mirror-like surface that has a fine surface roughness. Further, since it is required to have a high degree of sealing performance, even a shallow dent or scratch causes a quality problem. Therefore, there has been a demand for a visual inspection system which is able to detect an extremely shallow dent or scratch present on a mirror-like surface of an annular product.

However, the above-described conventional visual inspection system has a problem that it is unable to detect a defect such as a shallow dent or scratch present on such a mirror-like surface of an annular product. Specifically, in the above-described conventional visual inspection system, since the annular product is illuminated with a non-directional uniform diffused illumination light, a significant difference is not obtained between the quantity of light reflected by the normal portion of the annular product and entering the front-surface imaging camera and the quantity of light reflected by the defective portion of the annular product and entering the front-surface imaging camera, so that the defective portion cannot be detected from the image captured by the front-surface imaging camera.

More specifically, the normal portion of the annular product regularly reflects the diffused illumination light and a part of the regularly reflected light enters the front-surface imaging camera, while the defective portion of the annular product irregularly reflects most of the diffused illumination light and a part of the irregularly reflected light enters the front-surface imaging camera. Therefore, a significant difference is not produced between the quantity of light reflected by the normal portion and entering the front-surface imaging camera and the quantity of light reflected by the defective portion and entering the front-surface imaging camera. The present invention has been achieved in view of the above-described circumstances, and an object of the invention is to provide a visual inspection system which is able to detect a defect such as a shallow dent or scratch present on a mirror-like surface of an annular product.

Solution to Problem

To solve the above-descried problem, the present invention provides a visual inspection system inspecting an appearance of an annular product, including:

a holding unit that holds the annular product;

a rotation drive unit that causes the holding unit holding the annular product to rotate about a center axis of the annular product;

a first illumination unit that has a line-shaped light projector disposed along a radial direction of the annular product, and that radiates a filmy illumination light radiated from the light projector to an outside surface of the annular product to illuminate the outside surface of the annular product;

a line sensor camera that has a line-shaped light receiving unit and is arranged such that the light receiving unit thereof is disposed parallel to the light projector of the first illumination unit, and that images, from a direction identical to a direction of radiation of the illumination light radiated to the annular product by the first illumination unit, a region illuminated with the illumination light on the outside surface of the annular product as a region to be imaged; and a judgment device that processes an image captured by the line sensor camera to judge whether the annular product is defective in appearance or not.

In this visual inspection system, first, an annular product as an inspection target is held by the holding unit and a filmy illumination light along the radial direction of the annular product is radiated to an outside surface of the annular product from the light projector of the first illumination unit by the first illumination unit, whereby the outside surface of the annular product is illuminated. Subsequently, a region illuminated with the illumination light on the outside surface of the annular product is imaged as a region to be imaged by the line sensor camera while the holding unit holding the annular product is being rotated about the center axis of the annular product by the rotation drive unit. By the annular product making one rotation about the center axis thereof as an axis of rotation, an image is captured by the line sensor camera. The captured image is processed by the judgment device, whereby whether the annular product is defective in appearance or not is judged.

The filmy illumination light radiated by the first illumination unit has some degree of diffusibility in the film width direction thereof but has little diffusibility in the film thickness direction thereof; therefore, the illumination light has some degree of directivity. Therefore, when the annular product has a mirror-like outside surface and the outside surface is normal, most of the illumination light is regularly reflected. Accordingly, appropriately adjusting the positional relationship between the line sensor camera and the first illumination unit allows most of the reflected light reflected by the region to be imaged to enter the line sensor camera. On the other hand, when the outside surface of the annular product has a defective portion such as a dent or a scratch thereon, the illumination light is irregularly reflected by the defective portion, so that most of the reflected light does not enter the line sensor camera.

By virtue of this phenomenon, even when the mirror-like outside surface of the annular product has a defect such as a shallow dent or scratch thereon, a significant difference is produced between the quantity of light reflected by the normal portion of the annular product and entering the line sensor camera and the quantity of light reflected by the defective portion of the annular product and entering the line sensor camera. This enables the judgment device to detect the defective portion. Thus, this visual inspection system is able to detect a defect such as a shallow dent or scratch present on a mirror-like surface of an annular product.

This visual inspection system may be configured according to the following aspect: the first illumination unit and the line sensor camera are arranged such that the light projector of the first illumination unit and a light receiving element of the line sensor camera are perpendicular to the center axis of the annular product; and the line sensor camera is arranged such that the light receiving element thereof receives at least a reflected light from a top surface of the annular product as the region to be imaged. The visual inspection system according to this aspect is able to mainly inspect the appearance of the top surface of the outside surface of the annular product.

Further, the visual inspection system may be configured according to the following aspect: the first illumination unit and the line sensor camera are arranged such that the light projector of the first illumination unit and a light receiving element of the line sensor camera intersect with the center axis of the annular product at an angle of not less than 20° and not more than 40°; and the line sensor camera is arranged such that the light receiving element thereof receives at least a reflected light from an inner peripheral surface of the annular product as the region to be imaged. The visual inspection system according to this aspect is able to mainly inspect the appearance of the inner peripheral surface of the outside surface of the annular product.

Further, the visual inspection system may be configured according to the following aspect: the first illumination unit and the line sensor camera are arranged such that the light projector of the first illumination unit and a light receiving element of the line sensor camera intersect with the center axis of the annular product at an angle of not less than 20° and not more than 40°; and the line sensor camera is arranged such that the light receiving element thereof receives at least a reflected light from an outer peripheral surface of the annular product as the region to be imaged. The visual inspection system according to this aspect is able to mainly inspect the appearance of the outer peripheral surface of the outside surface of the annular product.

Further, each of the visual inspection systems according to the above-described aspects may be configured according to the following aspect:

the visual inspection system further includes a second illumination unit and a third illumination unit respectively arranged on both sides of the filmy illumination light radiated to the annular product by the first illumination unit;

the second illumination unit is configured to radiate a blue illumination light to the region to be imaged on the annular product to be imaged by the line sensor camera;

the third illumination unit is configured to radiate a red illumination light to the region to be imaged on the annular product;

the first illumination unit is configured to radiate a green illumination light to the region to be imaged on the annular product;

the line sensor camera has three line-shaped light receiving units respectively detecting blue light, red light, and green light; and the judgment device is configured to process three images, blue, red, and green images, respectively captured by the light receiving units of the line sensor camera to judge whether the annular product is defective in appearance or not.

Also in the visual inspection system according to this aspect, similarly to the visual inspection systems according to the above-described aspects, the filmy illumination light radiated by the first illumination unit enables detection of a defect, even such as a shallow dent or scratch.

In addition, the blue illumination light and the red illumination light are radiated obliquely to the region to be imaged by the second illumination unit and the third illumination unit arranged on both sides of the filmy illumination light radiated by the first illumination unit. Accordingly, when a defect such as a dent or a scratch is present, an edge (wall) of the defect is illuminated with the blue illumination light and the red illumination light and the reflected lights from the edge enter the line sensor camera. On the other hand, the normal portion of the mirror-like surface of the annular product regularly reflects the obliquely incident blue illumination light and red illumination light; therefore, most of the reflected lights from the normal portion do not enter the line sensor camera.

Thus, in the visual inspection system according to this aspect, when a defect such as a dent or a scratch is present, an image with the edge of the defect highlighted is obtained; therefore, the defect can be more reliably detected. Further, the illumination lights radiated by the first illumination unit, the second illumination unit, and the third illumination unit are respectively a green illumination light, a blue illumination light, and a red illumination light that are different in wavelength; therefore, these illumination lights do not affect each other and a target defect can therefore be reliably detected.

Advantageous Effects of Invention

As described above, the visual inspection system according to the present invention is able to reliably detect even a defect such as a shallow dent or scratch present on a mirror-like outside surface of an annular product.

DESCRIPTION OF EMBODIMENTS

Hereinafter, a specific embodiment of the present invention will be described with reference to the drawings. A visual inspection system 1 according to this embodiment is suitable for inspection of the appearance of an annular product having a mirror-like outside surface. However, the inspection target for the visual inspection system 1 is not limited to such a product having a mirror-like surface. The visual inspection system 1 is also suitable for inspection of the appearance of an annular product having no mirror-like surface.

Figure 1:
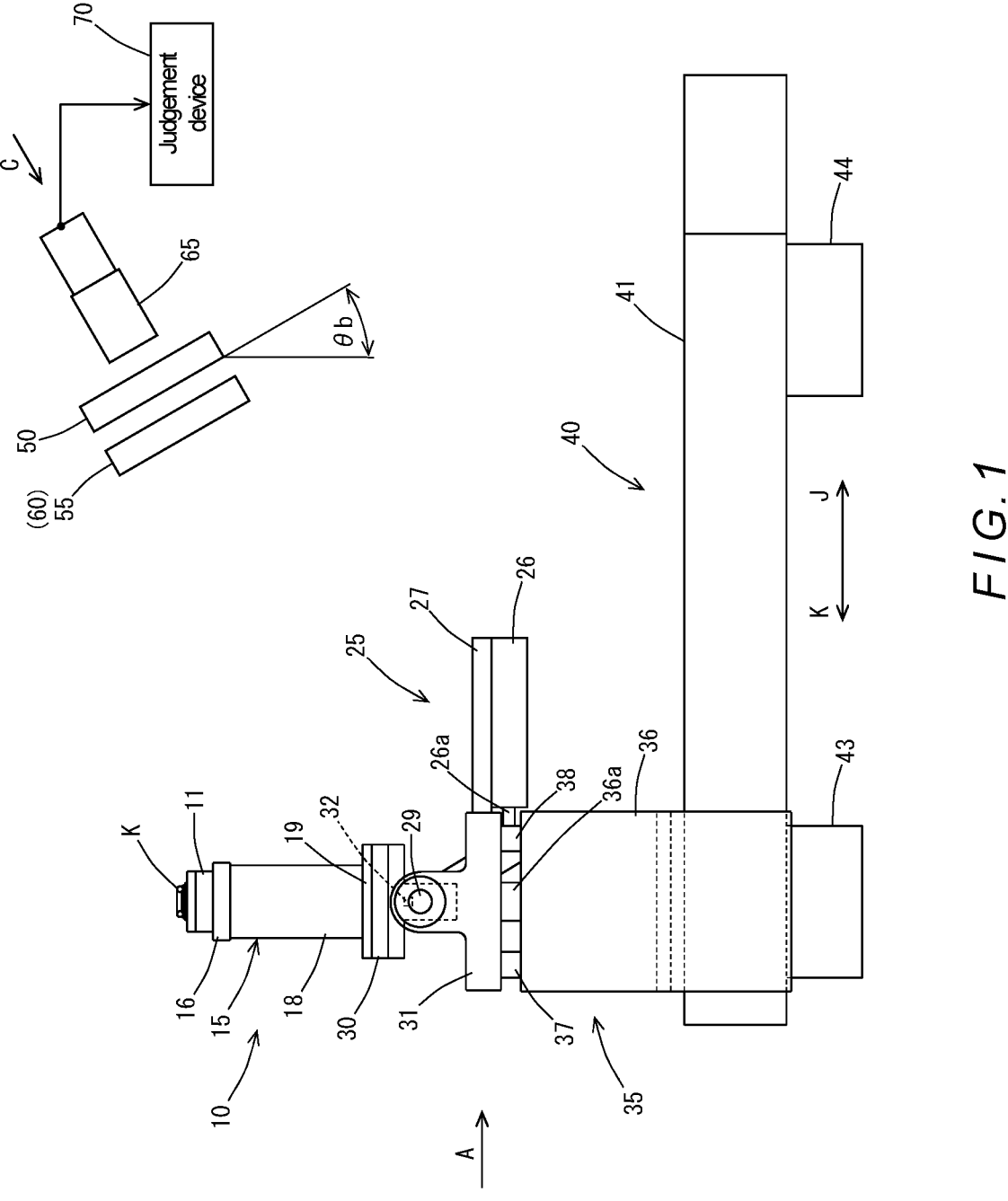
FIG. 1 is a front view illustrating a schematic configuration of a visual inspection system according to an embodiment of the present invention.
Figure 2:
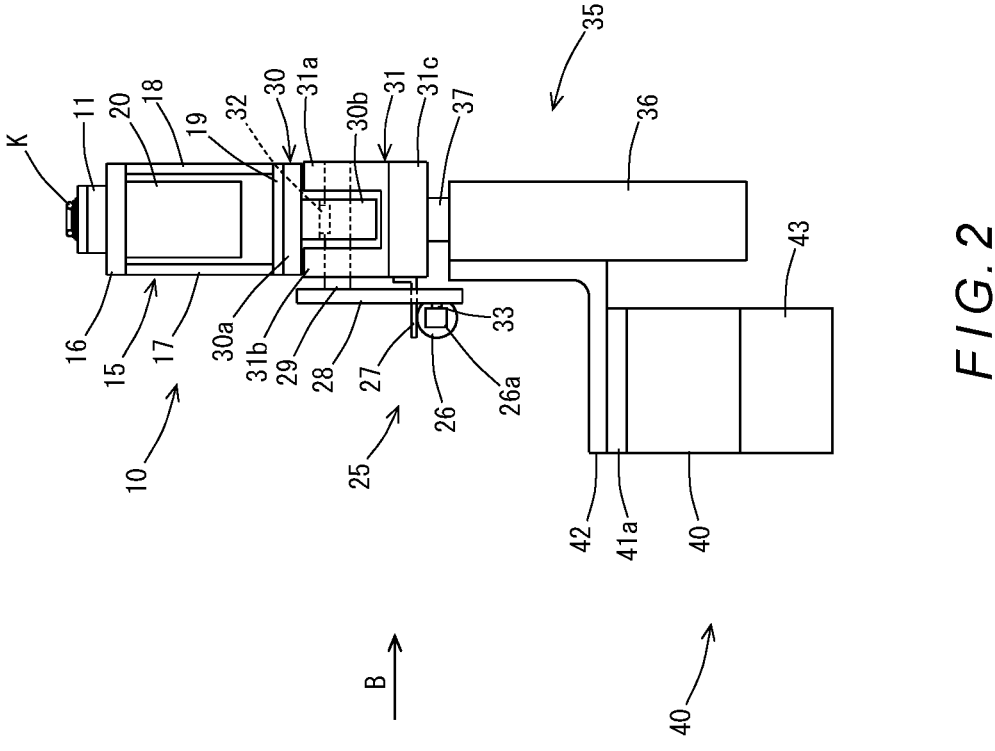
FIG. 2 is a side view of the visual inspection system as viewed in the direction of arrow A in FIG. 1.
Figure 3:
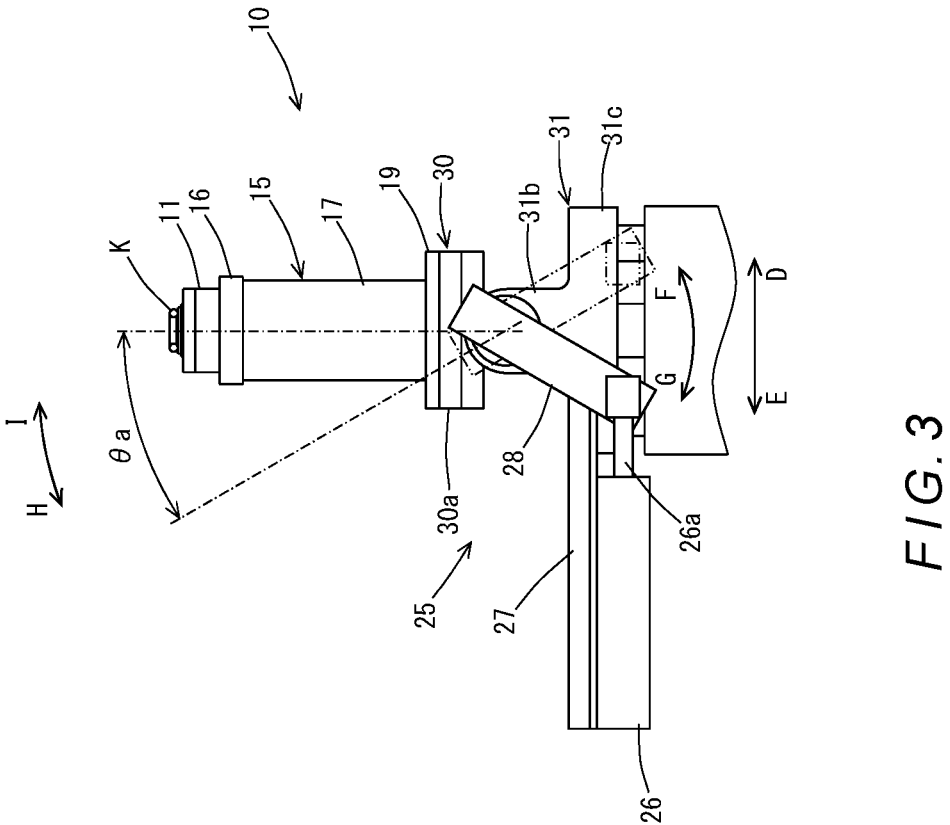
FIG. 3 is a rear view of the visual inspection system as viewed in the direction of arrow B in FIG. 2.
Figure 4:
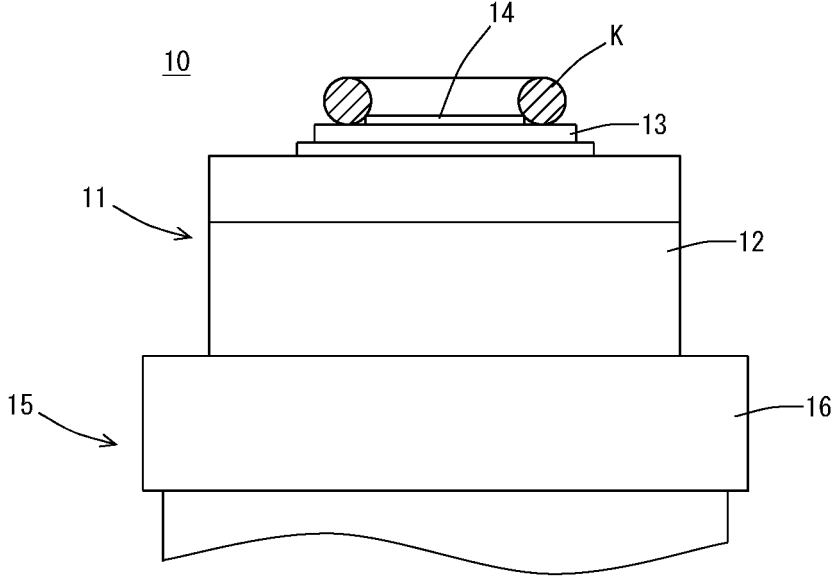
FIG. 4 is an enlarged front view of a holding mechanism in the embodiment.

As illustrated in FIGS. 1 to 3, the visual inspection system 1 according to this embodiment includes a holding mechanism 10 that holds an annular product K as the inspection target. The visual inspection system 1 further includes a drive motor 20, a swinging mechanism 25, an elevating mechanism 35, a moving mechanism 40, a first illumination unit 50, a second illumination unit 55, a third illumination unit 60, a line sensor camera 65, and a judgment device 70.

As illustrated in FIGS. 1 to 4, the holding mechanism 10 consists of a holding table 11 and a holding frame 15. The holding table 11 has a cylindrical shape and holds the annular product K. The holding frame 15 supports the holding table 11 such that the holding table 11 is rotatable about the central axis thereof. The holding table 11 has a cylindrical base 12, a cylindrical supporting portion 13, and a cylindrical positioning portion 14. The supporting portion 13 is coaxially arranged on a top surface of the base 12. The positioning portion 14 is coaxially arranged on a top surface of the supporting portion 13.

The positioning portion 14 is configured such that an outer peripheral surface thereof comes into contact with an inner peripheral surface of the annular product K when the annular product K placed on the supporting portion 13 is fitted around the positioning portion 14. Thus, the annular product K is positioned on the supporting portion 13 by the positioning portion 14 (see particularly FIG. 4). Although not particularly illustrated, the top surface of the supporting portion 13 in this embodiment has an opening formed therein to which a negative pressure is applied. When the annular product K is placed onto the supporting portion 13, the annular product K is sucked onto the top surface of the supporting portion 13 by the negative pressure.

The holding frame 15 consists of a top plate 16, side plates 17 and 18, and a bottom plate 19 that are assembled together to form a casing. Specifically, the side plates 17, 18 are respectively erected on a pair of side edges of the bottom plate 19 to face each other and the top plate 16 is fixed on the side plates 17, 18. The holding table 11 is rotatably arranged on the top plate 16 via a bearing arranged on the top plate 16.

The drive motor 20 is fixed to a lower surface of the top plate 16 and an output shaft thereof is connected to the holding table 11 arranged on the top plate 16. Thus, the drive motor 20 is configured to cause the holding table 11 to rotate about the center axis thereof.

As illustrated in FIGS. 2 and 3, the swinging mechanism 25 includes a swinging cylinder 26, a supporting member 27, a link plate 28, a coupling shaft 29, a swinging member 30, and a fork end 31. The swinging member 30 has a horizontal portion 30*a* and a vertical portion 30*b* extending downward from the center of a lower surface of the horizontal portion 30*a*. The horizontal portion 30*a* has an upper surface connected to a lower surface of the bottom plate 19.

The fork end 31 consists of a horizontal portion 31*c* and two supporting portions 31*a* and 31*b* extending upward from the horizontal portion 31*c* with a predetermined interval therebetween. With the vertical portion 30*b* of the swinging member 30 inserted between the supporting portions 31*a*, 31*b* of the fork end 31, the coupling shaft 29 is inserted through the supporting portions 31*a*, 31*b* and the vertical portion 30*b*. Note that a key 32 is provided between the coupling shaft 29 and the vertical portion 30*b*, so that the coupling shaft 29 and the vertical portion 30*b* are coupled to each other by the key 32 so as to rotate together about the center axis of the coupling shaft 29. Further, the piston rod 36*a* of the elevating cylinder 36 that is described in detail later is connected to a lower surface of the horizontal portion 31*c* of the fork end 31.

The swinging cylinder 26 is disposed horizontally such that a piston rod 26*a* thereof is perpendicular to the coupling shaft 29. The swinging cylinder 26 is fixed to the horizontal portion 31*c* of the fork end 31 via the supporting member 27 that has an angled shape. The distal end of the piston rod 26*a* is connected to a lower portion of the link plate 28 via a coupling shaft 33. The coupling shaft 33 is connected to the link plate 28 in a state of being inserted in a slotted hole formed along the longitudinal direction of the link plate 28 in the lower portion of the link plate 28. The link plate 28 has an upper portion fixed to the end of the coupling shaft 29.

Thus, when the piston rod 26*a* moves forward and backward in the axial direction thereof, i.e., in the direction of arrow D-E in FIG. 3, the link plate 28 swings in the direction of arrow F-G in a vertical plane about the center axis of the coupling shaft 29 and the coupling shaft 29 rotates about the axis thereof. Consequently, the swinging member 30 and the holding mechanism 10 connected to the swinging member 30 swing in the direction of allow H-I in a vertical plane about the center axis of the coupling shaft 29. In this embodiment, when the piston rod 26*a* is positioned at the backward end in the E direction, the center axis of the holding table 11 is parallel to a vertical axis. On the other hand, when the piston rod 26*a* is positioned at the forward end in the D direction, the center axis of the holding table 11 is inclined at an angle θa with respect to the vertical axis. Note that the angle θa is appropriately set in the range of 50° to 70°.

The elevating mechanism 35 includes an elevating cylinder 36 that has a piston rod 36*a* disposed along the vertical direction. The distal end of the piston rod 36*a* is connected to the lower surface of the horizontal portion 31*c* of the fork end 31. The elevating cylinder 36 also has guide rods 37 and 38 that are arranged parallel to the piston rod 36*a* with the piston rod 36*a* located therebetween. Thus, when the piston rod 36*a* moves up and down, the swinging mechanism 25 and the holding mechanism 10 move up and down accordingly. In this movement, the swinging mechanism 25 and the holding mechanism 10 move up and down in a stable posture by virtue of the guiding function of the guide rods 37, 38.

The moving mechanism 40 consists of a rodless moving cylinder 41, a connecting member 42, and two support bases 43 and 44. The moving cylinder 41 has a carriage 41*a* that is movable along the longitudinal direction of the moving cylinder 41. The moving cylinder 41 is arranged such that the longitudinal direction thereof extends horizontally, so that the carriage 41*a* is movable in a horizontal direction (in the direction of arrow J-K in FIG. 1). The connecting member 42 has an L-shaped cross section, and a horizontal portion thereof is fixed to a top surface of the carriage 41*a* and a vertical portion thereof is fixed to the elevating cylinder 36. The support bases 43, 44 support the moving cylinder 41 horizontally.

The moving mechanism 40 in this embodiment is able to position the carriage 41*a* at a plurality of predetermined positions. Accordingly, the elevating mechanism 35 connected to the carriage 41*a* via the connecting member 42, the swinging mechanism 25 connected to the elevating mechanism 35, and the holding mechanism 10 connected to the swinging mechanism 25 can be positioned at the plurality of predetermined positions. In this example, they can be positioned at a standby position shown in FIG. 1, a first inspection position shown in FIG. 8, a second inspection position shown in FIG. 10, and a third inspection position shown in FIG. 12.

The drive motor 20 is supplied with electric power from an appropriate electric power supply source, and the supply of electric power is controlled by an appropriate controller. The swinging cylinder 26, the elevating cylinder 36, and the moving cylinder 41 are each operated by pressure fluid, in this example, compressed air supplied from an appropriate compressed air supply source, and the operation thereof is controlled by a control valve that operates under control by the controller.

Figure 5:
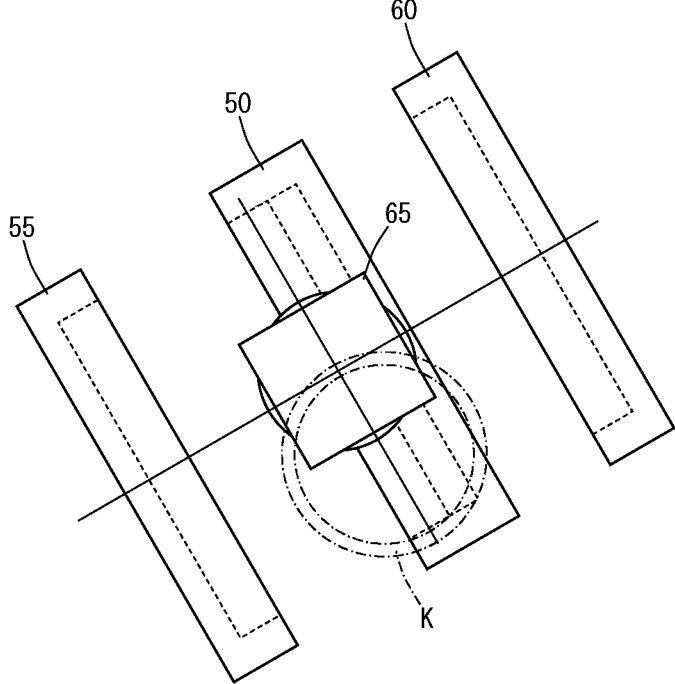
FIG. 5 is a view as viewed in the direction of arrow C in FIG. 1.
Figure 6:
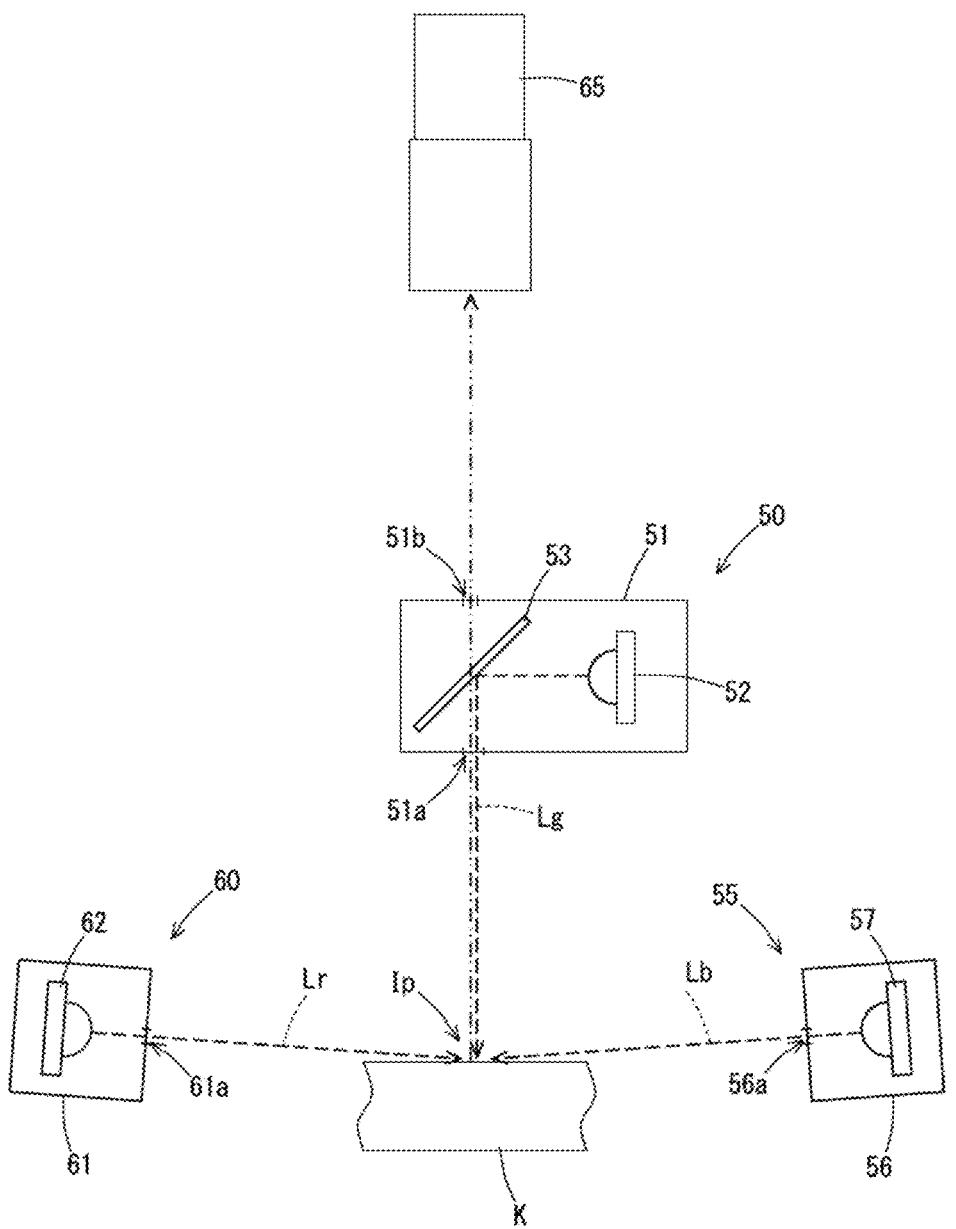
FIG. 6 is an illustrative diagram showing configurations of and a positional relationship between a line sensor camera, a first illumination unit, a second illumination unit, and a third illumination unit in the embodiment.

As illustrated in FIGS. 5 and 6, the first illumination unit 50 consists of an elongated casing 51, a line-shaped light projector 52 disposed in the casing 51, and an elongated half mirror 53 also disposed in the casing 51. The half mirror 53 is arranged in front of the light projector 52 in the radiating direction of the light projector 52. The light projector 52 is composed of a plurality of LED lamps that are arranged in line and emit green light, so that the light projector 52 radiates a filmy illumination light. The half mirror 53 is arranged in a state of being inclined at an angle of 45° with respect to the filmy illumination light radiated from the light projector 52.

Thus, the first illumination unit 50 is configured such that the light radiated from the light projector 52 is reflected 90° by the half mirror 53 and is radiated outward through one elongated opening 51*a* formed in the casing 51. On the other hand, a light entering the casing 51 through the opening 51*a* passes through the half mirror 53 and is radiated outward through the other elongated opening 51*b* formed in the casing 51 at the side opposite to the opening 51*a*.

As illustrated in FIG. 1, the first illumination unit 50 is located on the right side as viewed from the front and above the moving cylinder 41 when the holding table 11 is positioned at the standby position. The position of the first illumination unit 50 is adjusted so that the center plane (the plane corresponding to the center in the film thickness direction) of the filmy illumination light reflected by the half mirror 53 coincides with the plane in which the center axis of the holding table 11 is swung in the direction of arrow H-I by the swinging mechanism 25.

Figure 7:
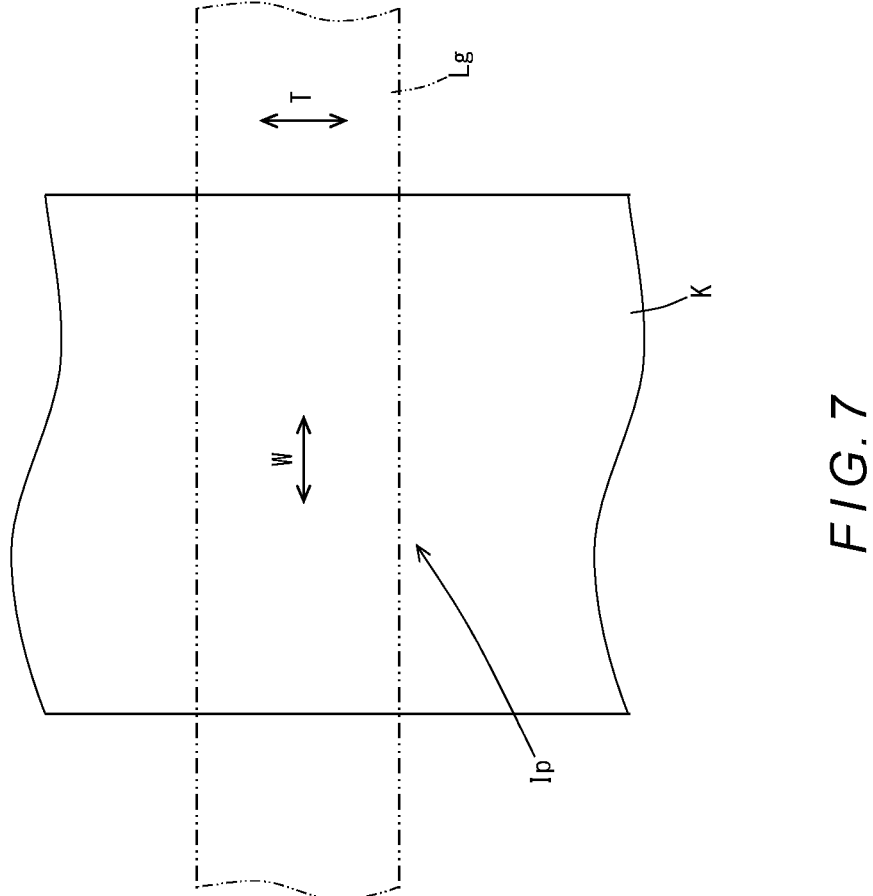
FIG. 7 is an illustrative diagram for explaining a feature of the first illumination unit in the embodiment.
Figure 8:
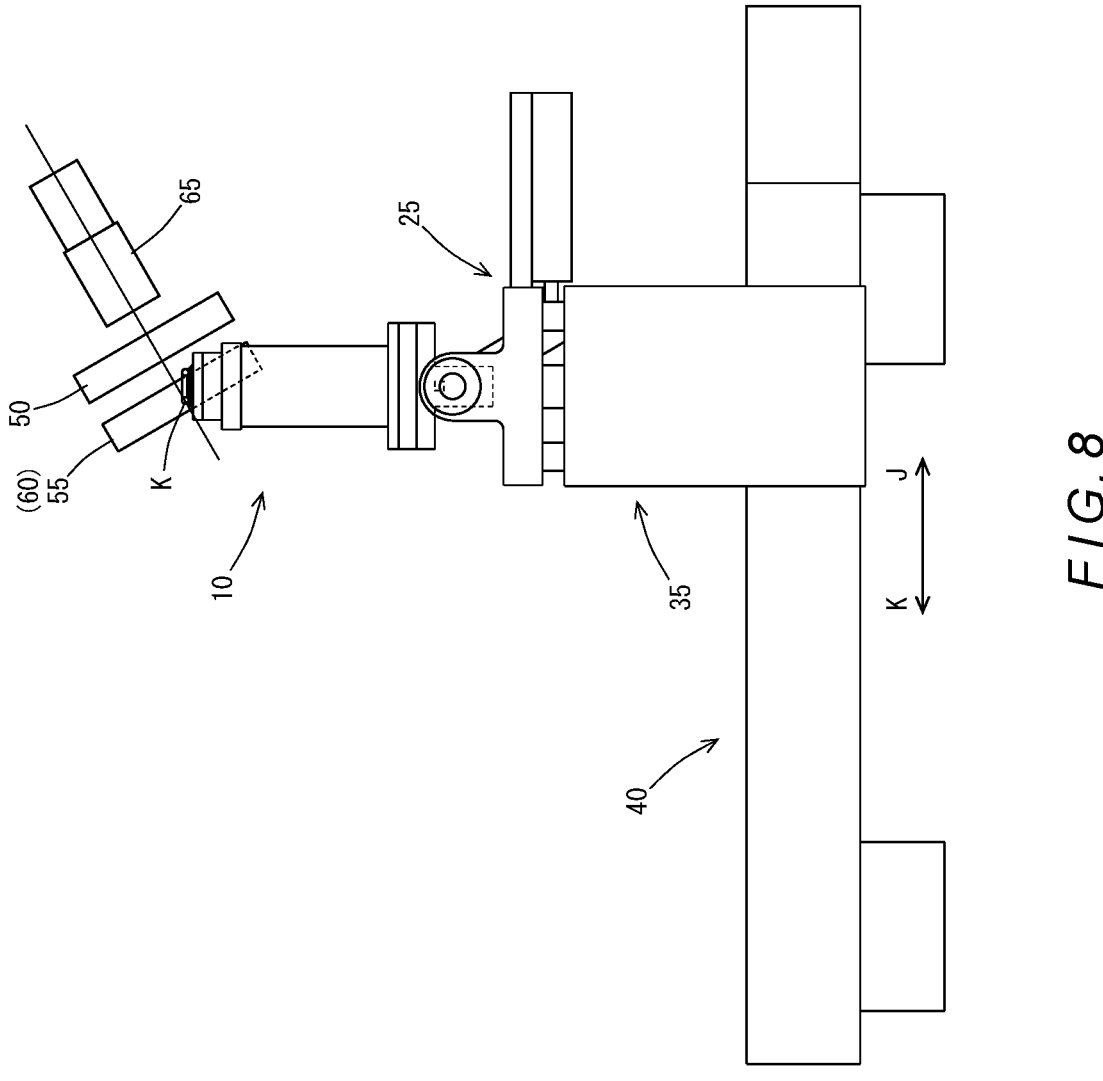
FIG. 8 is an illustrative diagram for explaining a manner of inspection at a first inspection position in the visual inspection system in the embodiment.

Thus, for example, when the holding mechanism 10 is positioned at the first inspection position shown in FIG. 8, the filmy illumination light radiated by the first illumination unit 50 illuminates the annular product K with a predetermined width corresponding to the film thickness (T shown in FIG. 7) along the radial direction including the center axis of the annular product K (see FIGS. 5, 6, and 7). The region illuminated with this filmy illumination light on the annular product K is a region to be imaged (region to be inspected) Ip. As illustrated in FIG. 1, the longitudinal direction of the first illumination unit 50 is inclined at an angle θb with respect to a vertical axis. This angle θb is set in the range of 20° to 40° and set to satisfy θb=90°−θa with respect to the above-mentioned angle θa.

The second illumination unit 55 and the third illumination unit 60 are each composed of an elongated illumination unit similarly to the first illumination unit 50. As illustrated in FIGS. 5 and 6, the second illumination unit 55 and the third illumination unit 60 are arranged parallel to the first illumination unit 50 respectively on both sides of the filmy illumination light radiated by the first illumination unit 50.

As illustrated in FIGS. 5 and 6, the second illumination unit 55 consists of an elongated casing 56 and a line-shaped light projector 57 disposed in the casing 56. The light projector 57 is composed of a plurality of LED lamps that are arranged in line and emit blue light. A filmy illumination light radiated from the light projector 57 is radiated outward through an elongated opening 56a formed in the casing 56. Note that the second illumination unit 55 is arranged to illuminate the region to be imaged Ip on the annular product K from the first illumination unit 50 side (see FIG. 6).

Similarly, the third illumination unit 60 consists of an elongated casing 61 and a line-shaped light projector 62 disposed in the casing 61. The light projector 62 is composed of a plurality of LED lamps that are arranged in line and emit red light. A filmy illumination light radiated from the light projector 62 is radiated outward through an elongated opening 61a formed in the casing 61. Note that the third illumination unit 60 is also arranged to illuminate the region to be imaged Ip on the annular product K from the first illumination unit 50 side (see FIG. 6).

As illustrated in FIG. 6, the line sensor camera 65 is arranged to be located behind the first illumination unit 50 with respect to the annular product K present at each inspection position. The line sensor camera 65 has three line-shaped light receiving units that are respectively configured to detect blue light, red light, and green light. The line sensor camera 65 is arranged such that the light receiving units are disposed parallel to the light projector 52 of the first illumination unit 50 and such that it is able to image the region to be imaged Ip on the annular product K present at each inspection position through the half mirror 53 of the first illumination unit 50.

The judgment device 70 is composed of a computer including a CPU, a RAM, and a ROM. The judgement device 70 processes three images, namely, blue, red, and green images, captured by the line sensor camera 65 to determine based on the luminance levels of the images whether or not a defect such as a dent or a scratch is present on the annular product K.

The visual inspection system 1 according to this embodiment having the above-described configuration inspects the appearance of the annular product K as the inspection target as follows.

Note that the visual inspection system 1 has been set to the following state: the carriage 41a of the moving cylinder 41 is positioned at the moving end in the direction of arrow K; and the holding mechanism 10, the swinging mechanism 25, and the elevating mechanism 35 are positioned at the standby position shown in FIG. 1. Further, the piston rod 26a of the swinging cylinder 26 is positioned at the end in the direction of arrow E and the holding mechanism 10 is in the state where the center axis of the holding table 11 lies along the vertical direction. Furthermore, the elevating cylinder 36 the piston rod 36a of is positioned at the lower end of the elevating cylinder 36.

First, the annular product K as the inspection target is fitted around the positioning portion 14 of the holding mechanism 10 and placed onto the supporting portion 13 manually or by using an appropriate supply device such as a robot. The annular product K is sucked onto the supporting portion 13 by the negative pressure.

Figure 9:
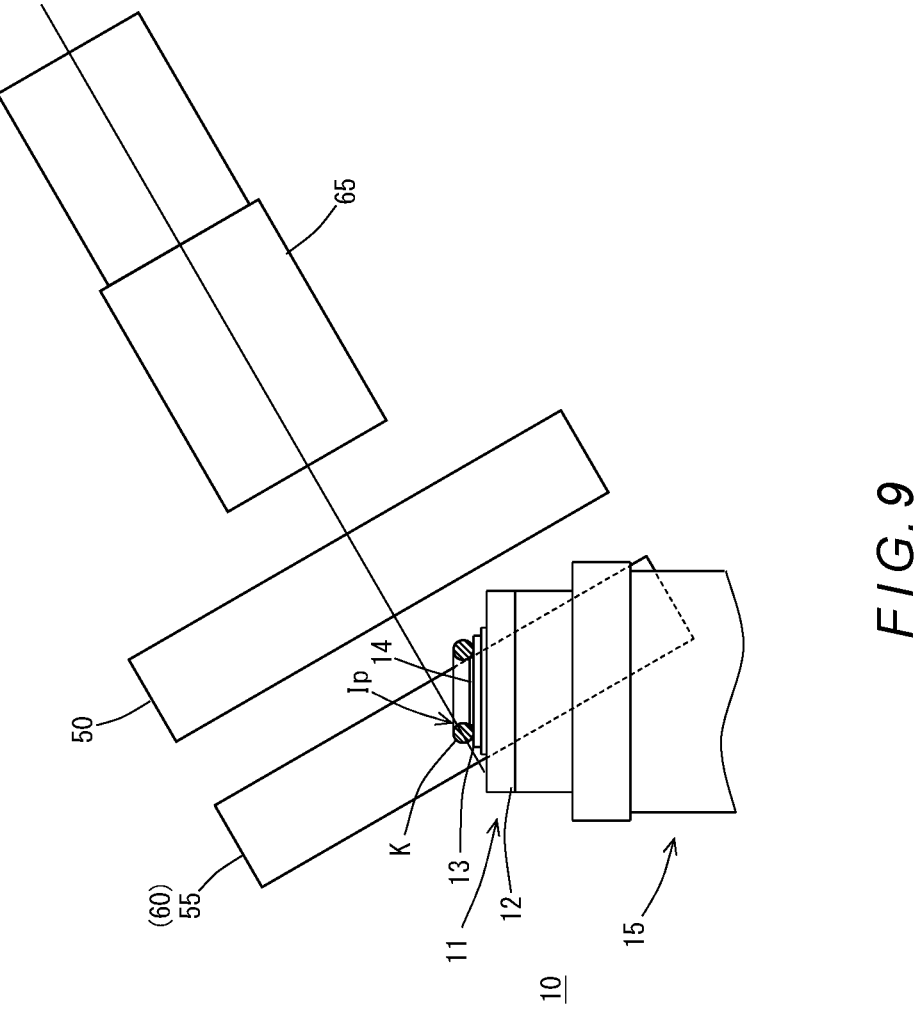
FIG. 9 is an illustrative diagram showing an enlarged view of the visual inspection system shown in FIG. 8.

Subsequently, the carriage 41a is moved in the direction of arrow J to position the holding mechanism 10, the swinging mechanism 25, and the elevating mechanism 35 at the first inspection position shown in FIG. 8. Thereafter, the region to be imaged Ip on the annular product K is illuminated by the first illumination unit 50, the second illumination unit 55, and the third illumination unit 60. Subsequently, while the region to be imaged Ip on the annular product K is being imaged by the line sensor camera 65, the holding table 11 is rotated by the drive motor 20 so that the annular product K held by the holding table 11 makes one rotation about the center axis thereof. As illustrated in FIG. 9, at the first inspection position, the line sensor camera 65 is in a posture to image an upper inner peripheral surface of the annular product K, so that the line sensor camera 65 continuously images the upper inner peripheral surface of the annular product K while the annular product K makes one rotation.

Thereafter, the image captured by the line sensor camera 65 is transmitted to the judgment device 70. The judgment device 70 processes the image and determines based on the luminance level of the image whether or not a defect such as a dent or a scratch is present on the annular product K.

The filmy green illumination light Lg radiated by the first illumination unit 50 has some degree of diffusibility in the film width direction (the W direction in FIG. 7) but has little diffusibility in the film thickness direction (the T direction in FIG. 7); therefore, the illumination light Lg has some degree of directivity. When the annular product K has a mirror-like outside surface and the outside surface is normal, most of the illumination light Lg is regularly reflected. Accordingly, appropriately adjusting the positional relationship between the line sensor camera 65 and the first illumination unit 50 allows most of the reflected light reflected by the region to be imaged Ip to enter the line sensor camera 65. On the other hand, when the outside surface of the annular product K has a defective portion such as a dent or a scratch thereon, the illumination light Lg is irregularly reflected by the defective portion, so that most of the reflected light does not enter the line sensor camera 65.

By virtue of this phenomenon, even when the mirror-like outside surface of the annular product K has a defect such as a shallow dent or scratch thereon, a significant difference is produced between the quantity of light reflected by the normal portion of the annular product K and entering the line sensor camera 65 and the quantity of light reflected by the defective portion of the annular product K and entering the line sensor camera 65. This enables the judgment device 70 to detect the defective portion. Thus, the visual inspection system 1 is configured to illuminate the annular product K with the filmy green illumination light Lg radiated by the first illumination unit 50, which enables detection of a defect such as a shallow dent or scratch present on the surface of the annular product K even when the annular product K has a mirror-like surface.

Further, in the visual inspection system 1 according to this embodiment, the filmy blue illumination light Lb and the filmy red illumination light Lr are radiated obliquely to the region to be imaged Ip by the second illumination unit 55 and the third illumination unit 60 from both sides of the filmy illumination light Lg radiated by the first illumination unit 50. Accordingly, when a defect such as a dent or a scratch is present on the annular product K, an edge (wall) of the defect is illuminated with the blue illumination light Lb and the red illumination light Lr and the reflected lights from the edge enter the line sensor camera 65. On the other hand, the normal portion of the mirror-like surface of the annular product K regularly reflects the obliquely incident blue illumination light Lb and red illumination light Lr; therefore, most of the reflected lights do not enter the line sensor camera 65. Thus, the visual inspection system 1 is configured to illuminate the region to be imaged on the annular product K obliquely with the blue illumination light Lb and the red illumination light Lr radiated by the second illumination unit 55 and the third illumination unit 60, which enables detection of a defect such as a shallow dent or scratch present on the surface of the annular product K even when the annular product K has a mirror-like surface.

Thus, the visual inspection system 1 according to this embodiment is suitable for detection of a defect such as a shallow dent or scratch present on the surface of an annular product K even when the annular product K has a mirror-like surface.

Figure 10:
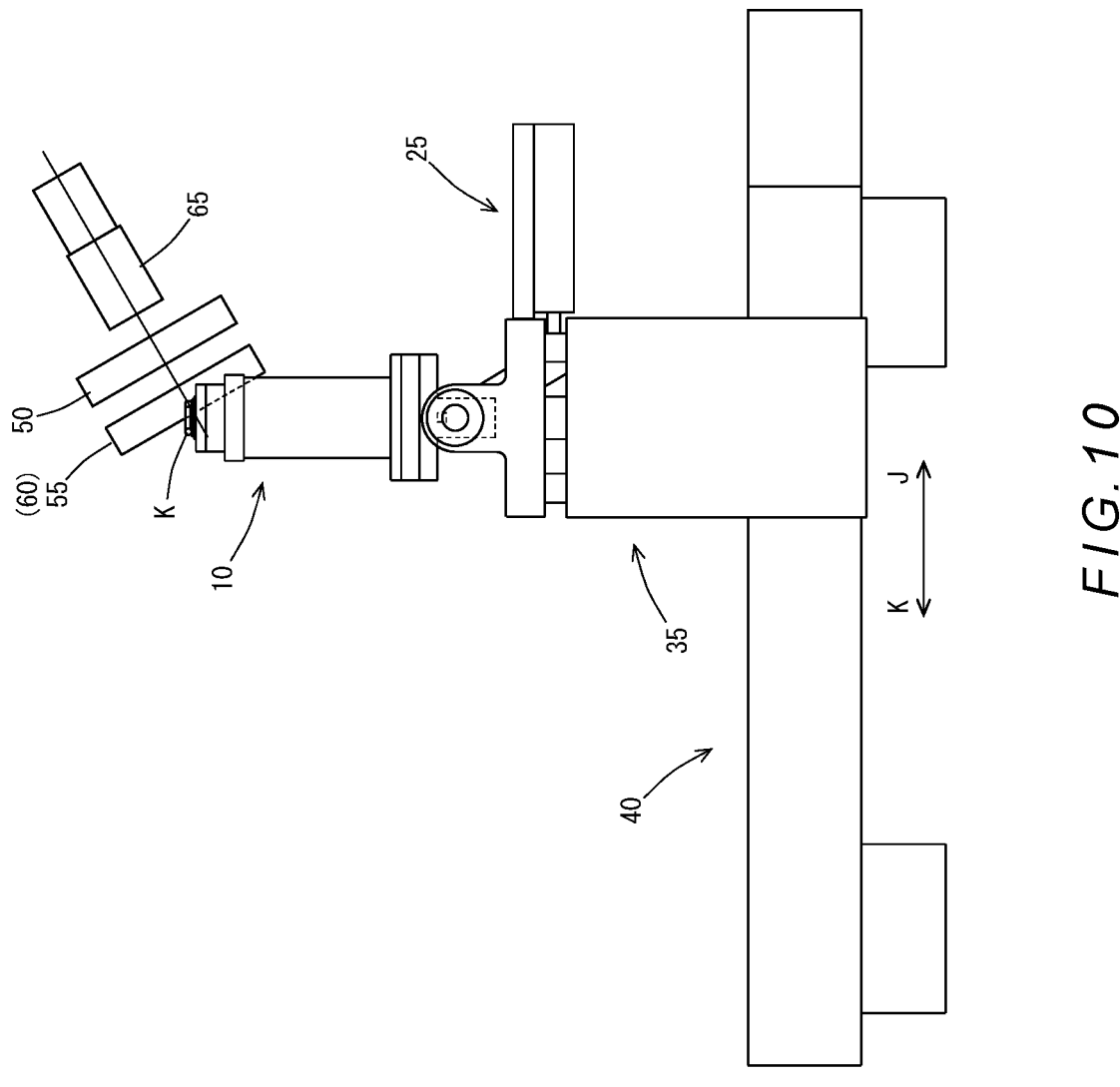
FIG. 10 is an illustrative diagram for explaining a manner of inspection at a second inspection position in the visual inspection system in the embodiment.
Figure 11:
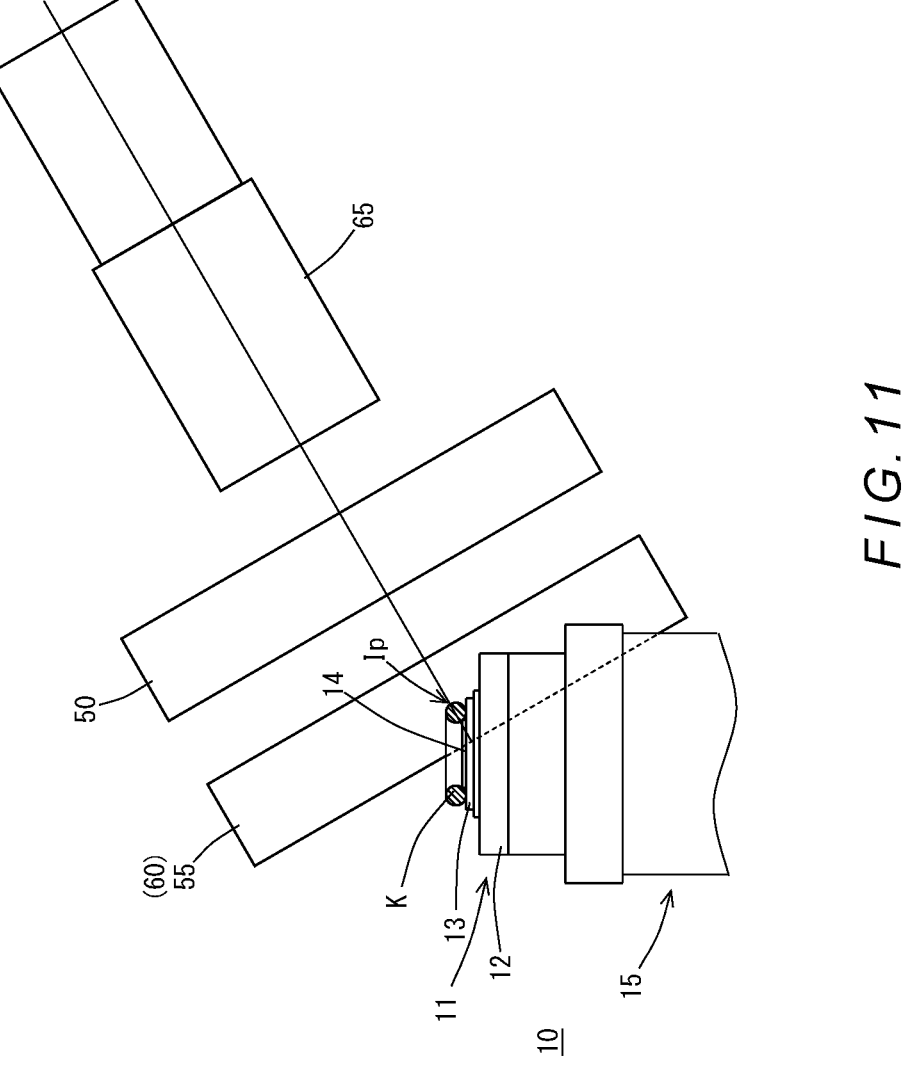
FIG. 11 is an illustrative diagram showing an enlarged view of the visual inspection system shown in FIG. 10.

After the above-described inspection of the upper inner peripheral surface of the annular product K at the first inspection position is completed, the carriage 41a is moved in the direction of arrow K to position the holding mechanism 10, the swinging mechanism 25, and the elevating mechanism 35 at the second inspection position shown in FIG. 10. As illustrated in FIG. 11, the region to be imaged Ip at the second inspection position is an upper outer peripheral surface of the annular product K. The same operation as the above-described operation at the first inspection position is carried out at the second inspection position, whereby the appearance of the upper outer peripheral surface of the annular product K is inspected.

Specifically, while the region to be imaged Ip on the annular product K is being imaged by the line sensor camera 65 with the region to be imaged Ip illuminated by the first illumination unit 50, the second illumination unit 55, and the third illumination unit 60, the holding table 11 is rotated by the drive motor 20 so that the annular product K held by the holding table 11 makes one rotation about the center axis thereof. Thereby, an image of the upper outer peripheral surface of the annular product K is captured by the line sensor camera 65 and whether the appearance of the upper outer peripheral surface of the annular product K is defective or not is judged by the judgment device 70.

Figure 12:
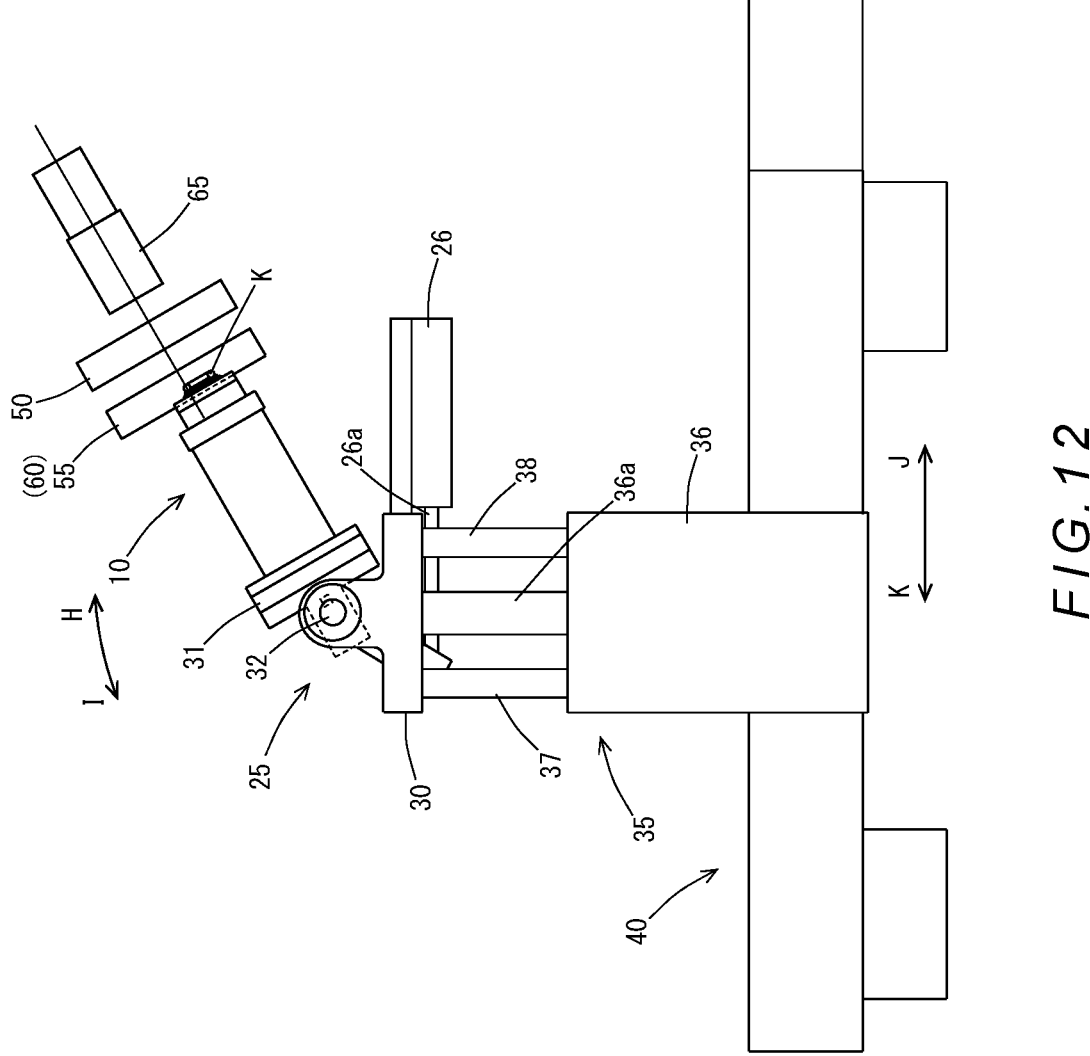
FIG. 12 is an illustrative diagram for explaining a manner of inspection at a third inspection position in the visual inspection system in the embodiment.
Figure 13:
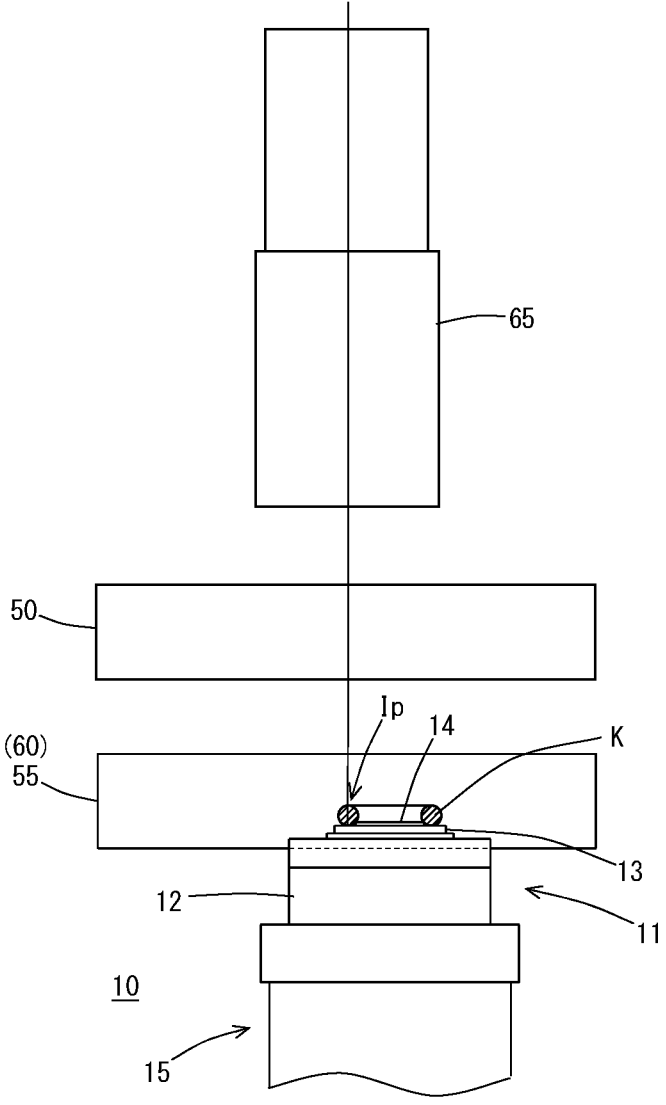
FIG. 13 is an illustrative diagram showing an enlarged view of the visual inspection system shown in FIG. 12.

After the above-described inspection of the upper outer peripheral surface of the annular product K at the second inspection position is completed, the carriage 41a is moved in the direction of arrow K to position the holding mechanism 10, the swinging mechanism 25, and the elevating mechanism 35 at the third inspection position shown in FIG. 12. Thereafter, the piston rod 36a of the elevating cylinder 36 is moved upward to the upward end and the swinging cylinder 26 is driven to move the piston rod 26a to the moving end in the direction of arrow D. Thereby, as shown in FIG. 12, the holding mechanism 10 is positioned at the upward end position and inclined by the angle θa in the direction of arrow H. Consequently, the imaging optical axis of the line sensor camera 65 and the center axis of the holding table 11, i.e., the center axis of the annular product K, become parallel to each other, and the region to be imaged Ip on the annular product K is set on a top-including upper surface of the annular object K. In this state, the same operation as the above-described operation at the first inspection position is carried out, whereby the appearance of the top-including upper surface of the annular product K is inspected.

Specifically, while the region to be imaged Ip on the annular product K is being imaged by the line sensor camera 65 with the region to be imaged Ip illuminated by the first illumination unit 50, the second illumination unit 55, and the third illumination unit 60, the holding table 11 is rotated by the drive motor 20 so that the annular product K held by the holding table 11 makes one rotation about the center axis thereof. Thereby, an image of the upper surface of the annular product K is captured by the line sensor camera 65 and whether the appearance of the upper surface of the annular product K is defective or not is judged by the judgment device 70.

After the above-described inspection of the appearance of the upper outside surface of the annular product K is completed, the carriage 41a is moved to the moving end in the direction of arrow K (to the standby position) and the piston rod 36a of the elevating cylinder 36 is moved downward to the downward end. Further, the piston rod 26a of the swinging cylinder 26 is moved to the moving end in the direction of arrow E to swing the holding mechanism 10 by the angle θa in the direction of arrow I so that the center axis of the holding table 11 becomes parallel to the vertical axis as shown in FIG. 3.

Subsequently, the annular product K is flipped vertically and fitted around the positioning portion 14 of the holding mechanism 10 manually or by using an appropriate supply device such as a robot, and the annular product K is sucked onto the supporting portion 13. Thereafter, the same process as described above is repeated, whereby the appearance of the other-side outside surface of the annular product K is inspected. In this manner, the appearance of the entire outside surface of the annular product K is inspected.

As described above, the visual inspection system 1 according to this embodiment is able to reliably detect a defect such as a shallow dent or scratch present on the outside surface of the annular product K even when the annular product K has a mirror-like outside surface.

Above has been described a specific embodiment of the present invention. However, it should be noted that the above-described embodiment is just an example. The present invention is not limited to the above-described embodiment and can be implemented in other manners.

For example, in the above-described embodiment, the second illumination unit 55 and the third illumination unit 60 are provided in addition to the first illumination unit 50. However, the present invention is not limited to this configuration and a configuration is possible in which only the first illumination unit 50 is provided. In this case, the illumination light radiated by the first illumination unit 50 may be of any color and the line sensor camera 65 may be any suitable camera capable of detecting the illumination light.

Further, in the above-described embodiment, the second illumination unit 55 and the third illumination unit 60 are each configured to radiate a filmy illumination light similarly to the first illumination unit 50. However, the present invention is not limited to this configuration and the second illumination unit 55 and the third illumination unit 60 may be each composed of a point light source that radiates a diffused light.

Further, in the above-described embodiment, the top-including outside surface, inner peripheral surface, and outer peripheral surface of the annular product K are inspected. However, a configuration is possible in which any one of these surfaces is inspected.

Further, in the above-described embodiment, the annular product K is sucked onto the supporting portion 13 by the negative pressure. However, such a sucking mechanism does not need to be provided where it is possible to hold the annular product K stably on the supporting portion 13.

REFERENCE SIGNS LIST

1 Visual inspection system
10 Holding mechanism
11 Holding table
14 Positioning portion
15 Holding frame
20 Drive motor
25 Swinging mechanism
26 Swinging cylinder
26a Piston rod
27 Supporting member
28 Link plate
29 Coupling shaft
30 Swinging member
31 Fork end
35 Elevating mechanism
36 Elevating cylinder
36a Piston rod
40 Moving mechanism
41 Moving cylinder
42 Connecting member
50 First illumination unit
51 Casing
52 Light projector
53 Half mirror
55 Second illumination unit
56 Casing
60 Third illumination unit
61 Casing
65 Line sensor camera
70 Judgment device

What is claimed is:

1. A visual inspection system inspecting an appearance of an annular product, comprising:
a holding unit configured to hold the annular product;
a rotation drive unit configured to cause the holding unit holding the annular product to rotate about a center axis of the annular product;
a first illumination unit having a line-shaped light projector disposed along a radial direction of the annular product, the first illumination unit being configured to radiate a filmy illumination light radiated from the line-shaped light projector to an outside surface of the annular product to illuminate the outside surface of the annular product;
a line sensor camera having a line-shaped light receiving unit, the line sensor camera being arranged such that the line-shaped light receiving unit thereof is disposed parallel to the line-shaped light projector of the first illumination unit and being configured to image, from a direction parallel to a direction of radiation of the illumination light radiated to the annular product by the first illumination unit, a region illuminated with the illumination light on the outside surface of the annular product as a region to be imaged; and
a judgment device configured to process an image captured by the line sensor camera to judge whether the annular product is defective in appearance or not,
wherein either the holding unit or the first illumination unit and the line sensor camera are moveable between inspection positions to alternately image, as the region to be imaged, a top surface, an inner peripheral surface and an outer peripheral surface of the annular product that is being rotated about the center axis, and wherein the top surface, the inner peripheral surface and the outer peripheral surface of the annular product are curved surfaces,
wherein the first illumination unit and the line sensor camera are arranged such that the light projector of the first illumination unit and a light receiving element of the line sensor camera intersect with the center axis of the annular product at an angle of not less than 20° and not more than 40°; and
wherein the line sensor camera is arranged such that the light receiving element thereof receives at least a reflected light from the inner peripheral surface of the annular product as the region to be imaged.

2. A visual inspection system inspecting an appearance of an annular product, comprising:
a holding unit configured to hold the annular product;
a rotation drive unit configured to cause the holding unit holding the annular product to rotate about a center axis of the annular product;
a first illumination unit having a line-shaped light projector disposed along a radial direction of the annular product, the first illumination unit being configured to radiate a filmy illumination light radiated from the line-shaped light projector to an outside surface of the annular product to illuminate the outside surface of the annular product;
a line sensor camera having a line-shaped light receiving unit, the line sensor camera being arranged such that the line-shaped light receiving unit thereof is disposed parallel to the line-shaped light projector of the first illumination unit and being configured to image, from a direction parallel to a direction of radiation of the illumination light radiated to the annular product by the first illumination unit, a region illuminated with the illumination light on the outside surface of the annular product as a region to be imaged; and
a judgment device configured to process an image captured by the line sensor camera to judge whether the annular product is defective in appearance or not,
wherein either the holding unit is movable or the first illumination unit and the line sensor camera are moveable between inspection positions to alternately image, as the region to be imaged, a top surface, an inner peripheral surface and an outer peripheral surface of the annular product that is being rotated about the center axis, and wherein the top surface, the inner peripheral surface and the outer peripheral surface of the annular product are curved surfaces, wherein the first illumination unit and the line sensor camera are arranged such that the light projector of the first illumination unit and a light receiving element of the line sensor camera intersect with the center axis of the annular product at an angle of not less than 20° and not more than 40°; and wherein the line sensor camera is arranged such that the light receiving element thereof receives at least a reflected light from the outer peripheral surface of the annular product as the region to be imaged.

3. The visual inspection system according to claim 1, wherein:

the visual inspection system further comprises a second illumination unit and a third illumination unit respectively arranged on both sides of the filmy illumination light radiated to the annular product by the first illumination unit;

the second illumination unit is configured to radiate a blue illumination light to the region to be imaged on the annular product to be imaged by the line sensor camera;

the third illumination unit is configured to radiate a red illumination light to the region to be imaged on the annular product;

the first illumination unit is configured to radiate a green illumination light to the region to be imaged on the annular product;

the line sensor camera has three line-shaped light receiving units respectively detecting blue light, red light, and green light; and the judgment device is configured to process three images, blue, red, and green images, respectively captured by the light receiving units of the line sensor camera to judge whether the annular product is defective in appearance or not.

4. The visual inspection system according to claim 2, wherein:

the visual inspection system further comprises a second illumination unit and a third illumination unit respectively arranged on both sides of the filmy illumination light radiated to the annular product by the first illumination unit;

the second illumination unit is configured to radiate a blue illumination light to the region to be imaged on the annular product to be imaged by the line sensor camera;

the third illumination unit is configured to radiate a red illumination light to the region to be imaged on the annular product;

the first illumination unit is configured to radiate a green illumination light to the region to be imaged on the annular product;

the line sensor camera has three line-shaped light receiving units respectively detecting blue light, red light, and green light; and the judgment device is configured to process three images, blue, red, and green images, respectively captured by the light receiving units of the line sensor camera to judge whether the annular product is defective in appearance or not.

* * * * *